UNITED STATES PATENT OFFICE.

CHARLES O. WHITE AND EDWARD M. WHITE, OF CHICAGO, ILLINOIS.

COMPOSITION FOR CLEANING STONE, &c.

SPECIFICATION forming part of Letters Patent No. 241,902, dated May 24, 1881.

Application filed October 15, 1880. (Specimens.)

*To all whom it may concern:*

Be it known that we, CHARLES O. WHITE and EDWARD M. WHITE, of Chicago, in the county of Cook and State of Illinois, have invented or discovered certain new and useful Improvements in a Composition for Cleaning and Renovating Stone and Marble; and we hereby declare the following to be a full, clear, and exact description of the invention, that will enable others skilled in the art to which it appertains to compound and make use of the same.

Our invention relates to a composition for cleaning stone and marble; and it consists of several ingredients united to form a liquid compound in about the proportions hereinafter set forth.

In preparing our compound we take thirteen gallons of muriatic acid, to which are added four pounds of muriate of ammonia, two pounds of alum, and two pounds of sal-soda. The degree of strength of the muriatic acid used will depend upon the nature and quality of the stone being operated upon. A weaker solution will be required for soft stones than for hard ones. This will be readily understood by those who are skilled in cleaning and renovating stone.

This liquid composition is applied by means of an ordinary paint-brush, the face of the stone being afterward sponged off with clean water. This composition effectually removes all incrustations and leaves the stone perfectly free from all unnatural discolorations.

The process of cleaning the stone or building can be performed in much less time than by any other composition or method known to us, and at a very much less cost.

Having thus described our invention, what we claim, and desire to secure by Letters Patent, is—

A composition composed of muriatic acid, muriate of ammonia, alum, and sal-soda, substantially in the proportions hereinbefore set forth, and for the purpose described.

CHARLES O. WHITE.
EDWARD M. WHITE.

Witnesses:
L. A. BUNTING,
W. A. SCHONFELD.